Patented Oct. 26, 1937

2,097,414

UNITED STATES PATENT OFFICE 2,097,414

BENZENESULPHONALKANOLAMIDE DERIVATIVES AND PROCESS OF PRODUCING THEM

Morris S. Kharasch and Otto Reinmuth, Chicago, Ill., assignors to Eli Lilly and Company, Indianapolis, Ind., a corporation of Indiana No Drawing. Application January 23, 1937, Serial No. 121,976

8 Claims. (Cl. 260—124)

Our invention relates to a group of new products, p-aminobenzenesulphonalkanolamides, their salts, and their new intermediates, p-acetamidobenzenesulphonalkanolamides; and to the process of producing them.

Our new final products, p-aminobenzesulphonalkanolamides, have been found efficacious, both on oral and on parenteral administration, for the treatment of streptococcic and other infections, especially those of great virulence. Effective oral dosages in adult human cases are of the order of 100–1000 mg., and effective parenteral dosages of the order of 50–500 mg.

The new p-aminobenzenesulphonalkanolamides are represented by the following formula:

(1) 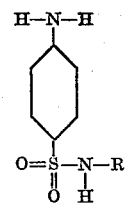

in which R represents an alkanol group having at least 2 and not to exceed 4 carbon atoms and at least 1 and not to exceed 2 hydroxyl groups. Among the alkanol groups included in R are the following:

—CH$_2$·CH$_2$OH
—CH$_2$·CH$_2$·CH$_2$OH
—CH$_2$·CHOH·CH$_3$
—CH$_2$·CHOH·C$_2$H$_5$
—CH$_2$·CHOH·CH$_2$OH
—CH:(CH$_2$OH)$_2$

These products are pale-cream-colored, almost white, crystalline solids; fairly soluble in cold water; and very soluble in hot water; soluble in alcohol, ethylene glycol, and propylene glycol; and insoluble in ether, in benzene, and in ligroin. They are of low toxicity, as compared with p-aminobenzenesulphonamide; which low toxicity, coupled with their relatively high water-solubility, makes these substances especially advantageous.

The new intermediates, p-acetamidobenzenesulphonalkanolamides, are represented by the following formula:

(2) 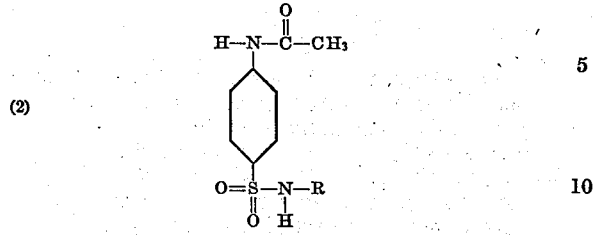

in which R has the same significance as before.

These products are white or nearly white crystalline solids; soluble in hot water, and in alcohol; and insoluble in ether and in benzene.

To prepare these new products, we proceed as follows:

*Step 1.*—To a water suspension of p-acetamidobenzenesulphonyl chloride, we add a water solution of an alkanolamine which contains at least 1 and not more than 2 hydroxyl groups and at least 2 and not to exceed 4 carbon atoms; and make the mixture definitely alkaline by using a sufficient excess of the amine or of some other base, such as sodium carbonate, to neutralize the hydrochloric acid formed in the reaction. This reaction may be represented by the following equation:

(3) 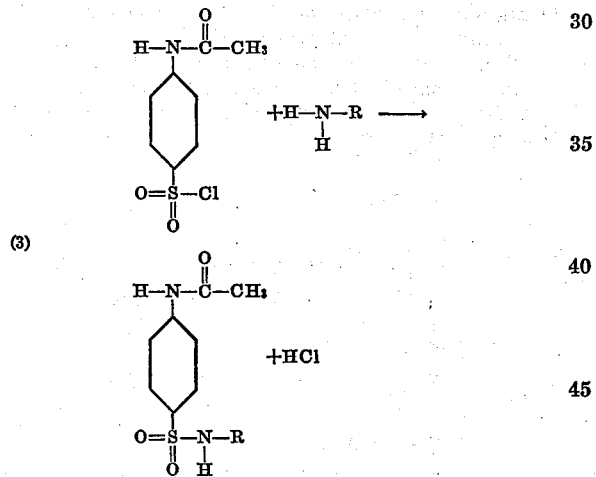

in which R has the same significance as before. The intermediate may be separated if desired, and purified by crystallization from water; but this is not necessary.

*Step 2.*—To the intermediate thus obtained, in suspension or solution in water, we now add a sufficient amount of non-oxidizing mineral acid, such as hydrochloric acid, to make the acid concentration not greater than 6N, and boil for 30 to 45 minutes. A reaction occurs, which may be represented by the following equation:

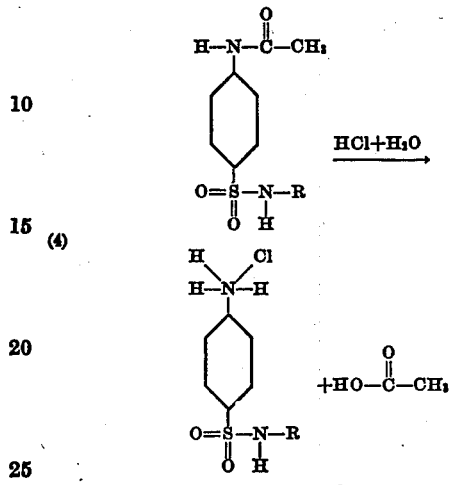

The reactive mixture is treated with a suitable base, such as sodium carbonate; whereupon the p-aminobenzene-sulphonamide is precipitated, and suitably removed, as by filtration. To get this precipitation, it is sometimes necessary to concentrate the solution by evaporation; in which case it is desirable to concentrate before the base is added, which has the added advantage of reducing the amount of base required if the acid is a volatile one.

The alkanolamine used may be any one of a number, according to the final product desired. Among them are the following:

Ethanolamine
Propanolamine
Isopropanolamine
Sec.—Butanolamine
Other isomeric butanolamines
α-Aminoglycerol
β-Aminoglycerol.

The following are examples of our process:

Example 1

*Step 1.*—To a suspension of 115 gms. of p-acetamidobenzenesulphonyl chloride in about a liter of water we add 50 gms. of isopropanolamine, and 32 gms. of sodium carbonate monohydrate. The sodium carbonate is desirably added slowly, in water solution—about 150 cc. of water. The following reaction occurs:

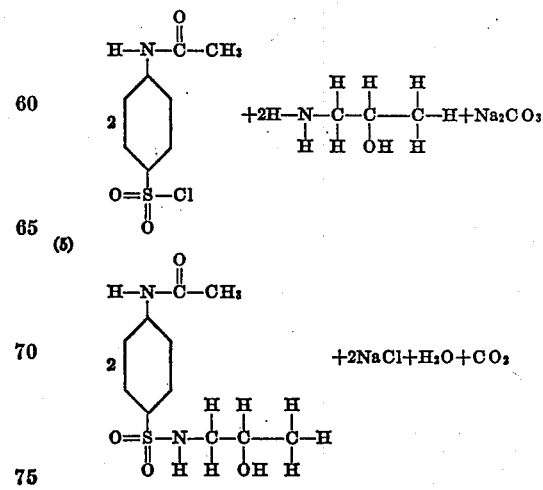

This intermediate thus formed, p-acetamidobenzenesulphonisopropanolamide, separates from the solution as a solid, and is suitably collected, as on a filter. It can be crystallized from water. It is a white crystalline solid, which melts at 165°–166° C. (uncorrected).

*Step 2.*—Five grams of this intermediate is suspended in 30 cc. of 6N hydrochloric acid. The whole is boiled, under a reflux condenser, until a clear solution is obtained, and the boiling is continued for from 30 to 45 minutes longer. The solution is cooled, and neutralized, as with sodium carbonate. A solid separates, and is collected on a filter, and crystallized from water. The yield is excellent—almost quantitative. This solid is the desired final product—p-aminobenzenesulphonisopropanolamide. It melts at 115° C. (uncorrected).

The reaction of step 2 may be represented as follows:

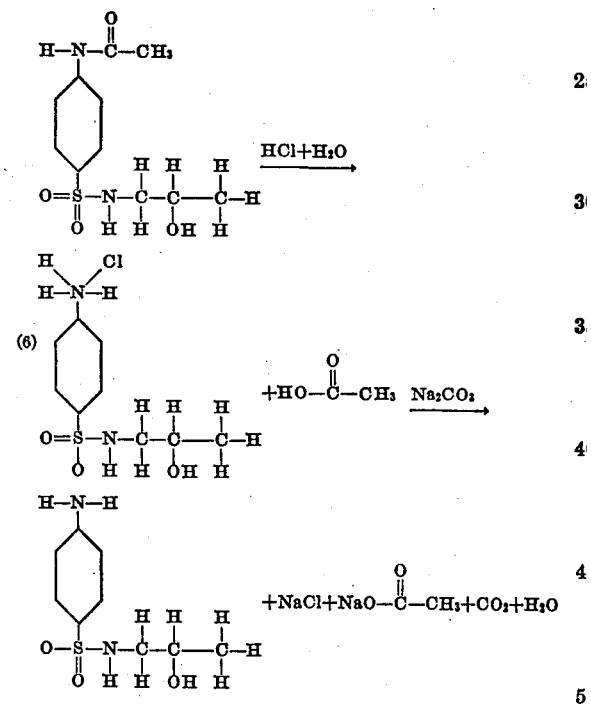

In some cases the material separates in the form of an oil which is very difficult to crystallize. It can be used as such; or, if a solid material is desirable, the oil is dissolved in alcohol and an ether solution of a suitable acid is added to it. The salt which is formed separates at once; and it is washed with ether, and dried, and can be used as such or the free amine can be liberated from it by dissolving it in water and adding a base such as sodium carbonate. In any case it is advantageous to isolate these materials first in the form of a salt. The nature of the acids one may use for forming such salts is described later.

Example 2

Instead of using the isopropanolamine of Example 1, we use ethanolamine. The process is otherwise that of Example 1, save that much less water is desirably used because of the greater solubility of both the intermediate and the final product. Further, the steps of separating the intermediate product, and crystallizing it, are conveniently omitted; as, indeed, they may be in Example 1.

Example 3

If still more soluble alkanolamines are used, such as an aminoglycerol, still less water is used, but otherwise the process of Examples 1 and 2 is used.

The various final products thus obtained are effective, on either oral or parenteral administration, to combat streptococcic and other infections. They may be administered orally in tablet form, or in solution in any non-toxic menstruum. They may be administered subcutaneously, intravenously, or intramuscularly in any suitable non-toxic solvent; for which we find water and the glycols, especially propylene glycol, mixed with water if desired, very advantageous. They may also be administered, either orally or subcutaneously or intramuscularly, in the form of the salts of non-toxic acids having a strength not less than that corresponding to an ionization constant of $10^{-4}$ such as the hydrochlorides, sulfates, lactates, tartrates, maleates, fumarates, succinates, etc.—which salts may be formed by treating the appropriate p-aminobenzenesulphonalkanolamides with the appropriate acids, the salt being dissolved in a suitable solvent, most conveniently water, for subcutaneous or intramuscular administration. The general formula for these salts is:

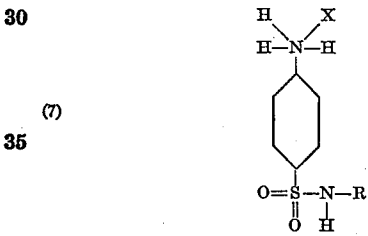

(7)

where R has the same significance as before, and X represents the negative ion of such an acid as just described.

We claim as our invention:

1. The new products, p-Y-benzenesulphonalkanolamides, which are represented by the following formula:

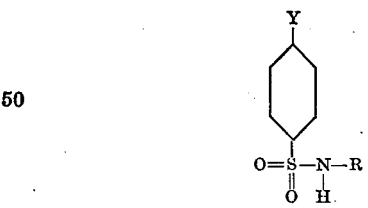

in which R represents an alkanol group having at least 2 and not to exceed 4 carbon atoms and at least 1 and not to exceed 2 hydroxyl groups, and Y represents a radical of the class consisting of the —NH₂ (amino) group, the —NH·CO·CH₃ (acetamido) group, and —NH₃·X with X representing the negative ion of a non-toxic acid having a strength not less than that corresponding to an ionization constant of $10^{-4}$.

2. The new products, p-aminobenzenesulphonalkanolamides, which are represented by the following formula:

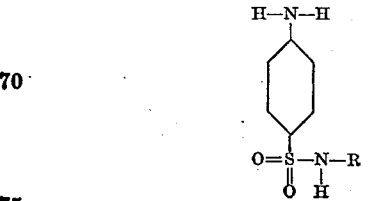

in which R represents an alkanol group having at least 2 and not to exceed 4 carbon atoms and at least 1 and not to exceed 2 hydroxyl groups.

3. The new products p-acetamidobenzenesulphonalkanolamides, which are represented by the following formula:

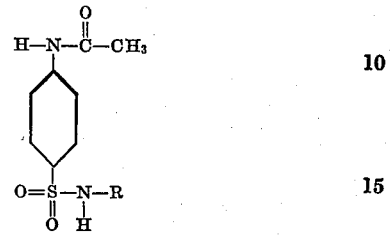

in which R represents an alkanol group having at least 2 and not to exceed 4 carbon atoms and at least 1 and not to exceed 2 hydroxyl groups.

4. The new product p-aminobenzenesulphonethanolamide, which is represented by the following formula:

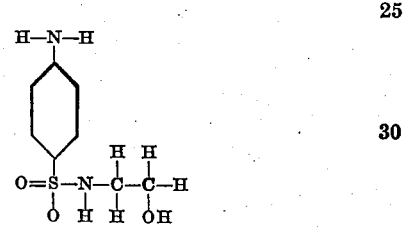

5. The new product p-aminobenzenesulphonisopropanolamide, which is represented by the following formula:

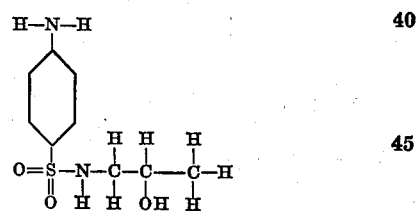

6. The process of making a p-aminobenzenesulphonalkanolamide, which consists in treating p-acetamidobenzenesulphonyl chloride with an alkanolamine which contains at least 1 and not to exceed 2 hydroxyl groups and at least 2 and not to exceed 4 carbon atoms, to yield the corresponding p-acetamidobenzenesulphonalkanolamide as an intermediate, and boiling that intermediate with hydrochloric acid to obtain the desired p-aminobenzenesulphonalkanolamide.

7. The process of making a p-aminobenzenesulphonalkanolamide, which consists in boiling with hydrochloric acid a p-acetamidobenzenesulphonalkanolamide in which the alkanolamine group contains at least 1 and not to exceed 2 hydroxyl groups and at least 2 and not to exceed 4 carbon atoms.

8. The process of making a p-acetamidobenzenesulphonalkanolamide, which consists in treating p-acetamidobenzenesulphonyl chloride with an alkanolamine which contains at least 1 and not to exceed 2 hydroxyl groups and at least 2 and not to exceed 4 carbon atoms.

MORRIS S. KHARASCH.
OTTO REINMUTH.